Feb. 2, 1960 S. K. ALTES 2,923,767
MODIFICATION OF BRIGHTNESS SIGNAL BY CHROMINANCE COMPONENTS
Filed March 21, 1955 3 Sheets-Sheet 1

INVENTOR:
STEPHEN K. ALTES,
BY George V. Eltgroth
HIS ATTORNEY.

Feb. 2, 1960 S. K. ALTES 2,923,767

MODIFICATION OF BRIGHTNESS SIGNAL BY CHROMINANCE COMPONENTS

Filed March 21, 1955 3 Sheets-Sheet 2

INVENTOR:
STEPHEN K. ALTES,

BY George R. Fitzpatrick [signature]

HIS ATTORNEY.

Feb. 2, 1960 S. K. ALTES 2,923,767

MODIFICATION OF BRIGHTNESS SIGNAL BY CHROMINANCE COMPONENTS

Filed March 21, 1955 3 Sheets-Sheet 3

INVENTOR:
STEPHEN K. ALTES,
BY George B. Ctgroth
HIS ATTORNEY.

United States Patent Office 2,923,767

Patented Feb. 2, 1960

2,923,767

MODIFICATION OF BRIGHTNESS SIGNAL BY CHROMINANCE COMPONENTS

Stephen K. Altes, Syracuse, N.Y., assignor to General Electric Company, a corporation of New York Application March 21, 1955, Serial No. 495,529

11 Claims. (Cl. 178—5.4)

This invention relates to electrical apparatus and a method for processing information-bearing signals. More particularly, the invention relates to electronic circuits and a method for resolving into three or more properly related components a signal carrying information as to more than one variable quantity. Still more particularly, the invention relates to circuits and a method for decoding a composite color-television signal to derive therefrom properly related signals representative of image brightness and color components.

In the type of color television system which has been approved for use in the United States, the transmitted signal comprises a total of three simultaneous component video signals. One of these component video signals is expressive of the brightness of a given element of the picture which is to be transmitted, while the other two component video signals are color-difference signals which are expressive of the chrominance of the given element of picture but not of its brightness. The brightness component signal is impressed by amplitude modulation upon a carrier wave of fixed frequency, while the chrominance component signals are respectively impressed by amplitude modulation upon a pair of chrominance subcarrier waves of fixed frequency somewhat higher than that of the brightness or luminance carrier wave and having a phase relationship of ninety degrees between them. If these chrominance subcarrier waves are themselves suppressed, as is the present practice, the entire color information is then left in the sidebands of the subcarrier waves. The signal which is actually transmitted is the modulation product of the transmitting-station carrier wave with the luminance component signal, with the two chrominance-component signals, and, of course, with a frequency-modulated audio signal, which may be disregarded for the purpose of this discussion.

In order to conserve bandwidth space in the spectrum of the video signals which are impressed upon the transmitting-station carrier wave, the present practice is to use frequency overlap between the channel in which the brightness or luminance carrier and its sidebands fall, and the channel in which the chrominance-component signals fall. It has been found that serious interference between the brightness or luminance component and the chrominance components can be avoided by judiciously choosing the spacing between the respective frequencies of the luminance carrier and of the chrominance subcarrier. Again, this matter need not receive further consideration in this discussion.

Another video-bandwidth conservation measure commonly practiced is the filtering away of part of the upper-frequency components of the chrominance information before it is impressed upon its subcarrier waves. In fact, not only is the bandwidth of the chrominance information narrowed, as compared with the luminance information, before being impressed upon the subcarrier waves, but in addition, the information carried in one of the chrominance components is narrowed more than the information carried in the other one of the chrominance components. The purpose of this differential narrowing of the two pieces of chrominance information is to permit one of the chrominance component signals to pass through a channel of limited bandwidth substantially without loss of sidebands, whereas loss of some high-frequency sidebands from the other chrominance-component signal can be tolerated because the information can be regained from the low-frequency sidebands. Successful detection of the two chrominance-component signals at the receiver without crosstalk between those component signals depends upon transmission of one of those chrominance-component signals substantially without loss of sidebands, that is, in double-sideband fashion. On the other hand, as has been stated, the other chrominance-component signal can be transmitted without part of its high-frequency sidebands, that is, in vestigial-sideband fashion. Since this latter chrominance-component signal, despite loss of part of its sidebands, still carries wider-band information than the chrominance-component signal which is transmitted in double-sideband fashion, this latter chrominance-component signal is selected to carry the more critical color information, while the double-sideband chrominance-component signal carries the color information which can be adequately conveyed by a narrower frequency channel. The choice of which color information is carried by which chrominance-component signal is made on the basis of psychological data as to which colors must be reproduced in the receiver image with the most fidelity in order to satisfy the eye of the viewer. Inasmuch as the eye is less sensitive to inaccuracies of reproduction of color than to inaccuracies of reproduction of brightness or luminance, the chrominance-component signals require less video bandwidth than does the luminance-component signal. Moreover, inasmuch as the eye is less sensitive to inaccuracies of reproduction of some colors than of others, the narrower-bandwidth chrominance-component signal (the one which is transmitted in double-sideband fashion), may be employed to carry information as to these color changes to which the eye is comparatively less sensitive.

While the specification has, to this point, referred to three separate video signals (the luminance component and two chrominance components), it will be understood that, when the video information has been impressed upon the transmitting-station carrier wave, the resultant modulated electromagnetic wave has only one voltage at a given point and time. Therefore, the task of the receiver is not only to derive the composite video signal from the captured electromagnetic wave, but also to unscramble the various video components from one another. This task presents some difficulty in the case of the two chrominance components, which represent information which was impressed upon two subcarrier waves of equal frequency. The fact that these two subcarrier waves were related in phase by an angle of ninety degrees makes possible the demodulation of the two chrominance-component signals by a process known as synchronous detection, which involves injection of two new waves into parts of the composite video signal, these new waves being of subcarrier frequency and, again, related in phase with each other by an angle of ninety degrees. My invention relates, among other things, to the apparatus and method for this synchronous detection, and to the relationship between the inputs to the synchronous detection apparatus in order to achieve detected outputs suitable for most efficient actuation of the output device. For the purposes of illustration, it will be assumed that this output device is a color picture tube having three electron guns, but it is to be expressly understood that the apparatus and method of my invention are applicable for purposes other than decoding of a color television signal. Since the illustration of my invention is to be drawn in terms of color television circuitry, with the more general case to be discussed thereafter, it will be necessary at this point to present certain further explanation of the composite color-television signal which has been adopted for uniform use in the United States. A color-television receiver employs an antenna, radio-frequency stages, intermediate-frequency stages and second detector which are similar to those employed by the common monochrome receiver and well known to those skilled in the electronic art. Hence, the further discussion will proceed on the assumption that the apparatus and functions involved in those receiver stages are familiar to all, and that only the "composite color television signal," which is the output of the second detector of the receiver, and the modifications made in this composite color television signal in order to render it useful need be described in detail. When this description has been presented, the application of the apparatus and method to circumstances other than color television will become apparent.

In order to make clear the nature of the composite color television signal, which is the signal impressed upon the transmitting-station carrier wave and recovered again at the output of the receiver second detector, a concise definition of the signal in mathematical terms will now be presented. As the color camera scans in a well known manner line after line of the picture which is to be transmitted, it measures the brightness or luminance of each element of picture and develops a voltage expressive of that element brightness. This voltage may be designated by the letter "Y" and is substantially the voltage which would be developed by a monochrome camera scanning the same element and picture. The color camera and associated circuits simultaneously (either directly or by mathematical manipulation) develop two voltages expressive of the chrominance of the successive elements of picture as they are scanned. It will be recalled that reference has been made supra to "chrominance," which is the colorimetric quantity characterizing a given picture element which must be added to a monochrome, or black-and-white, representation of the given picture element in order to produce a true-color representation thereof. The true-color representation will have luminance of brightness equal to that of the corresponding black-and-white representation but, in addition, will be tinted sufficiently to impart a realistic reproduction of color when the picture element is reproduced. Inasmuch as the chrominance of a picture element comprises only colorimetric information, a signal representative of chrominance will be zero if the picture element contains only tones of black, grey, or white. However, chrominance means more than simply the hue, or dominant wavelength of the picture element; it also includes information as to saturation, or intensity of color relative to the luminance of the picture element. Since chrominance thus comprises two continuous pieces of information, it must be represented by a signal having two degrees of freedom. If chrominance is represented by a vector having variable amplitude and phase relative to some reference wave, it will be seen that the two necessary degrees of freedom are satisfied. Further, as is well known, a vector may be resolved into two component vectors which may be arbitrarily chosen. In color television, it has become common practice to resolve the chrominance signal into two signals representable by a pair of orthogonal vectors. Depending upon the way in which this resolution is performed, the signals expressive of these resolved components of the chrominance are called, respectively, either $(R-Y)$ and $(B-Y)$, or Q and I. Different gain factors are applied in these "chrominance components" in order that the sum of either $(R-Y)$ and $(B-Y)$ or of Q and I may be accurately expressive of the chrominance of each element of picture. It will be noted that the designations $(R-Y)$ and $(B-Y)$ emphasize the fact that the luminance signal Y must be added to them in order to convey the entire information expressive of brightness, hue, and saturation of an element of picture image. Moreover, the designations Q and I emphasize the fact that these chrominance components are chosen in such a way as to be orthogonal, one component being "quadrature" and the other component being "in phase." It may be generally stated that, neglecting the effects of certain "gamma" correction for tube non-linearity, the amplitude of the chrominance vector relative to the luminance is roughtly expressive of color saturation, while phase of that vector with respect to a vector representing the chrominance subcarrier wave is roughtly expressive of hue, or dominant wavelength. These relationships will be further explained and graphically illustrated later in this specification. First, however, it is appropriate to set out the mathematical definition of the composite color television signal for which the foregoing material was presented as background. If the composite color television signal is designated by the letter E, then:

$$E=Y+\frac{1}{1.14}\left[\frac{1}{1.78}(B-Y)\sin wt+(R-Y)\cos wt\right] \quad \text{(Eq. 1)}$$

In Equation 1, it will be noted that sin $wt$ and cos $wt$ represent the two quadrature-related chrominance subcarrier waves to which reference was previously made.

Alternatively, if the vectors Q and I are selected, instead of $(B-Y)$ and $(R-Y)$, to constitute the signal E, then:

$$E=Y+Q\sin(wt+33^\circ)+I\cos(wt+33^\circ) \quad \text{(Eq. 2)}$$

It will be noted that the form of representation of Equation 2 eliminates the gain factors which had to be employed in the representation of Equation 1 but introduces a phase angle not present in Equation 1.

Further, there is another equation which relates the luminance-component signal Y with the signals expressive of the amounts of three primary colors in each element of color picture. It has been found that the hue of most picture elements to be reproduced may be specified in terms of three primary color components, red, green, and blue. The exact nature of these three primary color components is completely specified by means of the science of colorimetry as discussed, for instance, by Donald G. Fink in his article, "Color Fundamentals for Television Engineers," Electronics, December 1950, page 88; January 1951, page 78; February 1951, page 104. Since the exact nature of these primary color components can be specified, then signals respectively expressive of them can likewise be specified and may be denoted respectively as R, G, and B. It will be noted that the quantities R and B have already been employed in Equation 1, supra. Having defined the three primary color component signals R, G, and B, then it may be stated, as has been done in the color television standards approved by the Federal Communications Commission, that the three primary-color signal components expressive of the color of a picture element are related to the luminance component Y by the following expression:

$$Y=.30R+.59G+.11B \quad \text{(Eq. 3)}$$

In accordance with this expression, if the signals expressive of the three primary color components of a certain picture element are known, then the signal expressive of the luminance of the element is also known. Further, if the luminance signal and any two primary color signals for a given picture element are known, the third primary color signal is also known, thus completely specifying the element of picture. It has been shown in Equation 1 that the composite color television signal E can be specified in terms of Y, R, and B without expressly involving G, because G can then be found by means of Equation 3. Moreover, it has been shown in Equation 2 that E can be specified in terms of Y, Q and I, where Q and I are defined by the following equations:

$$Q=.41(B-Y)+.48(R-Y) \quad \text{(Eq. 4)}$$

$$I=-.27(B-Y)+.74(R-Y) \quad \text{(Eq. 5)}$$

These equations, like Equations 1, 2, and 3, are part of the signal specifications approved by the Federal Communications Commission for use throughout the United States. It should be stated once again that these equations neglect the so-called "gamma correction" for picture-tube non-linearity which is incorporated in the transmitted signals and, therefore, are only approximate. The justification for such simplification lies in the fact that my invention may be adequately explained without introducing the added complications of gamma correction.

The previous discussion has shown that E, the composite color television signal which is derived at the output of the receiver second detector, contains the luminance information for each element of picture and, in addition, contains information sufficient for derivation of all three primary color components of each element of picture. My invention pertains to apparatus and a method for deriving these components from E in such a way as to provide signals suitable for actuating the three electron guns of a color picture tube, one electron gun for each of the primary colors. While the actual signals desired between cathode and grid of the three electron guns are R, G, and B respectively, it is customary to supply, for instance, the signal Y to the grid and $(R-Y)$ to the cathode of the "red gun," thereby taking advantage of the ability of the gun itself to perform the addition and become actuated only by the quantity R, the desired actuating signal. One way to obtain this effect has been to separate the chrominance information from the signal E and feed a signal containing the chrominance information to each of the two synchronous detectors. By injecting into one of these synchronous detectors a wave of subcarrier frequency related in phase by an angle of ninety degrees to a wave of the same frequency injected into the other synchronous detector, it is possible to obtain $(R-Y)$ from one detector and $(B-Y)$ from the other detector, and to feed these signals to a matrix computing network which in turn produces $(G-Y)$ by virtue of the relationship of Equation 3. These "color difference" signals have then been fed to the cathodes of their respective electron guns, while a signal Y, derived from the signal E, has been fed, if desired, to the grids of all three electron guns, thereby permitting addition on the guns to produce respectively R, G, and B.

In the system as outlined in the preceding paragraph, there are certain economic and engineering difficulties, despite the fact that the system does permit addition of the luminance signal to the color-difference signal on the picture tube itself, thereby saving an adder stage. These difficulties have their root partly in the fact that the luminance signal Y as transmitted is a relatively broad-band signal whereas the chrominance signal, and the $(B-Y)$ chrominance components in particular, are relatively narrow-band signals. This difference in band-width between luminance and chrominance is unavoidable because, as has been explained, the human eye is more sensitive to changes in luminance than to changes in color. Therefore while approximately four-megacycles-per-second bandwidth is required in order to produce satisfactory brightness detail, satisfactory color reproduction can be obtained with an I bandwidth of 1.5 megacycles per second and a Q bandwidth of 0.5 megacycle per second. It will now be clear that, whereas the circuits which derive Y from E in the receiver must have a bandwidth of substantially four megacycles per second, the synchronous detectors and their associated circuits can perform satisfactorily with considerably smaller bandwidth. Moreover, since gain is more easily obtained at the relatively narrow bandwidth, it is advantageous not to design the synchronous detectors for any greater bandwidth than they require. Nevertheless, despite such design with economical principles in mind, the gain-producing properties of the $(B-Y)$ synchronous detector may be overtaxed even though the $(R-Y)$ synchronous detector is running at far less than full capacity. The explanation of this phenomenon lies in the relationship expressed by Equation 1 and Equation 3, which show that the Y signal, as applied to the electron-gun grid, contains only a very small amount of the signal B. Therefore, in order to get full drive of the "blue electron gun," such as would be required in order to reproduce a blue picture element, the color-difference signal $(B-Y)$ fed to the cathode must be very large. This fact means that the output of the $(B-Y)$ detector must be capable of attaining high values.

Another demonstration of the large output requirements placed upon the $(B-Y)$ detector may be achieved by considering what takes place if a yellow picture element is to be reproduced. Now, yellow is a color which comprises equal parts of the primary colors red and green, but no blue. Therefore, when yellow is reproduced, the "blue gun" must have no output. Equation 3 tells us that, when the color yellow is transmitted (since B must be zero), Y is equal on a normalized basis to .89, a very large fraction of unity, which represents on a normalized basis the luminance associated with standard white light. However, since the output of the "blue gun" must be zero when yellow is reproduced, the $(B-Y)$ detector must be capable of supplying to the cathode of the blue gun a $(B-Y)$ signal of $-.89$, on a normalized basis, in order to cancel out the effect of the large Y applied to the grid. It will be understood that polarities are treated on a schematic basis and that magnitudes are normalized since we are concerned only with relative magnitudes of the luminance and color signals.

We have shown that, on a normalized basis, the $(B-Y)$ detector output must be capable of a signal swing of $(.89+.89)$ or 1.78 in order to satisfy its most demanding requirements. On the other hand, the $(R-Y)$ detector output must be capable of a signal swing of only $(.70+.70)$ or 1.40 in order to satisfy its most demanding requirements. A factor which aggravates this non-symmetry is the fact that, while the greatest outputs are demanded from the $(B-Y)$ detector when the colors to be reproduced are blue or yellow, the greatest available inputs to that detector occur not for reproduction of blue or yellow, but of red or blue-green. Thus, it will be seen that, if a symmetrical system is employed, with $(B-Y)$ and $(R-Y)$ detectors having the same characteristics and no compensating circuitry, the $(B-Y)$ detector will be overtaxed, while the $(R-Y)$ detector operates far below capacity. This situation is clearly undesirable from an engineering and economic standpoint.

Accordingly, it is an object of my invention to provide apparatus and a method for permitting efficient synchronous detection of color-difference signals in a color television receiver.

It is another object of my invention to provide apparatus and a method for obtaining synchronous detection without overtaxing one piece of apparatus while another operates far below rated capacity.

More broadly, it is an object of my invention to provide a method and apparatus for processing a relatively wide-band signal and a relatively narrow-band signal to obtain three component signals having desired amplitude and phase relationships.

Specifically, it is an object of my invention to provide a method and apparatus for processing the composite color television signal to obtain three component color signals respectively suitable for actuating the three electron guns of a color picture tube.

The way in which these objects are fulfilled through the practice of my invention may be very briefly stated as follows:

I adjust the respective phases of the waves of subcarrier frequency injected in the two synchronous detectors so that those detectors produce respectively two signals which are not identical with $(R-Y)$ and $(B-Y)$. I then combine portions of these two signals to form a third signal, and I also feed back portions of the two aforementioned signals to the input of the signal path which processes the Y signal. By properly choosing the phase angles of the detector waves and by adding proper proportions of the detector output signals to the Y signal path and to each other, I am able to produce three signals each of which, when added to the output signal from the modified Y-signal path, constitutes respectively a primary color signal suitable for actuating an electron gun of the color picture tube. This result is accomplished without overloading either of the synchronous detectors and, furthermore, the practice of my invention even permits the detector-driving signals to be reduced. Various adjustments may be made either to reduce to an absolute minimum the required outputs of the synchronous detectors or else to permit the synchronous detectors to be driven by the same input chrominance signal while at the same time reducing the output-signal demands on the $(B-Y)$ detector far below the level called for in the absence of the practice of my invention.

For additional objects and advantages, and for a better understanding of my invention, attention is now directed to the following description and the accompanying drawings. The features of the invention which are believed to be novel are particularly pointed out in the appended claims.

Figure 5:
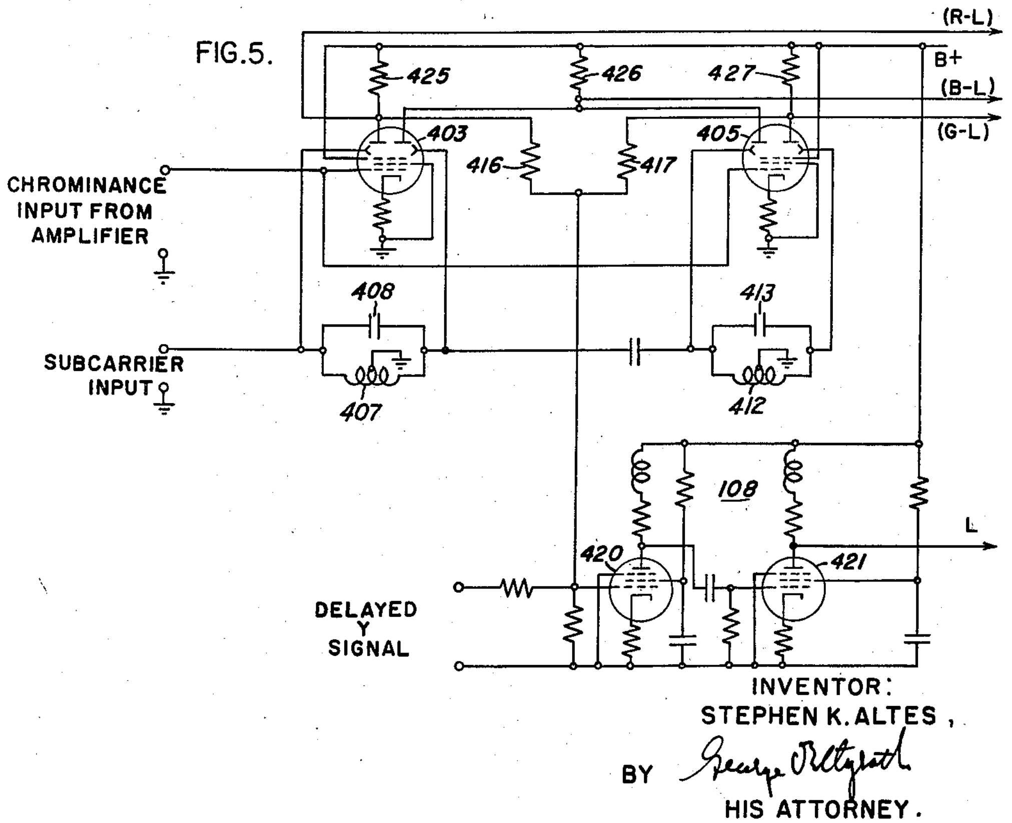
Figure 6:
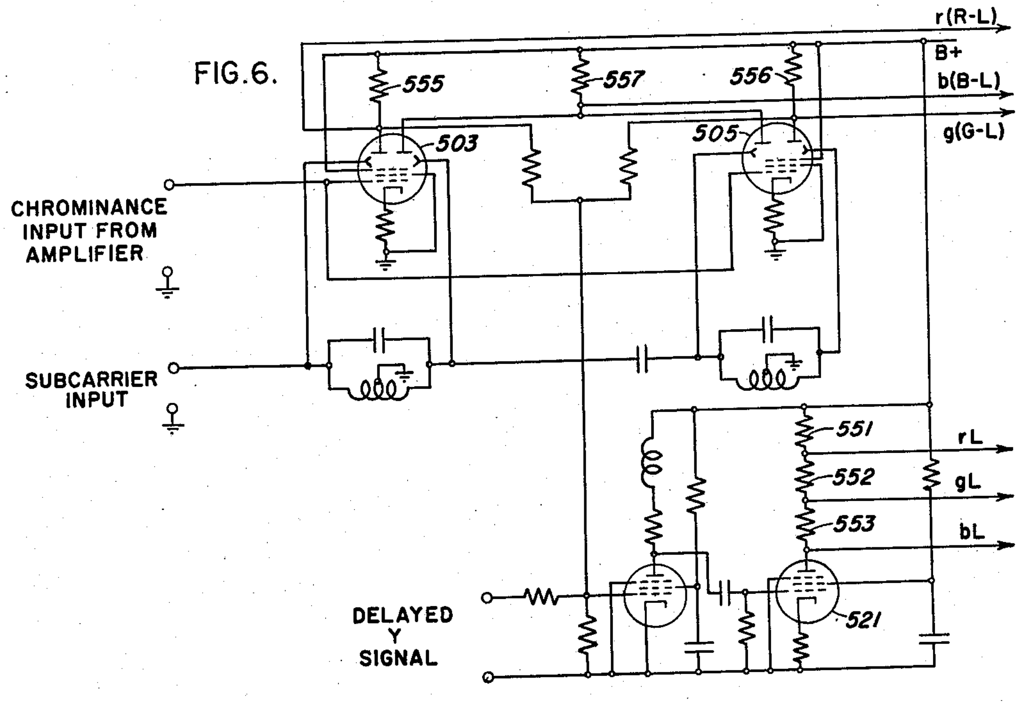

Fig. 5 is a detailed schematic diagram of a suggested embodiment of the two synchronous detectors, the modified-Y-channel amplifier, and the associated circuitry called for in a somewhat modified signal-processing system according to my invention in which some compromise is made in connection with the loading of the more heavily loaded synchronous detector in order that both synchronous detectors may be driven by the same input signal; and Fig. 6 is a detailed schematic diagram of a further modified embodiment comprising two synchronous detectors, broad-band amplifier, and associated circuitry.

As I have pointed out in the earlier paragraphs of this specification, the output of the second detector of a color television receiver is the composite color television signal E, which comprises a wide-band luminance signal Y and a comparatively narrow-band chrominance signal comprising two chrominance-component signals of different bandwidths, all of which must somehow be separated from one another in order to make possible the production of three color signals suitable for driving the three electron guns of the color picture tube. Inasmuch as the majority of frequency components of the Y signal fall below the chrominance components in the spectrum, a fair degree of separation thereof may be achieved by simply using a low-pass filter to derive Y from E, and a band-pass filter to derive the chrominance signal from E. Although these filters employ gradual cutoffs and need not be specified exactly, the low-pass filter for deriving Y may provide a response which is approximately 6 decibels down at 3.58 megacycles per second, the subcarrier frequency. Moreover, the band-pass filter for deriving the chrominance signal may be such as to pass roughly the frequency band between 3 and 4.2 megacycles per second or, if the chrominance signal is to be broken down into the components defined supra as Q and I, separate band-pass filters passing respectively 3 to 4.2 megacycles per second and 2.5 to 4.2 megacycles per second may be employed. In such a case, the chrominance signal can be broken into two parallel paths such that the signal Q would be detected in the narrow-band path and the signal I would be detected in the somewhat wider-band path. It will be understood that, in designing these filters, one prefers to pass some spurious signals rather than to make filter cutoffs so sharp that excessive ringing takes place in the transient response.

Figure 1:
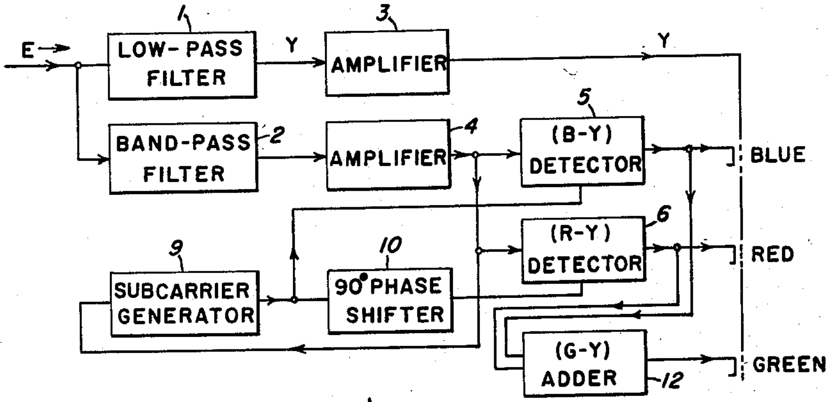
Fig. 1 is a schematic block diagram of a prior-art form of system for processing the composite color television signal to develop signals respectively suitable for actuating the three electron guns of a color picture tube.

Turning to Fig. 1 of the drawing representing a prior-art signal-processing system, I have shown the composite color television signal E fed to a low-pass filter 1 and a band-pass filter 2 such that the output of filter 1 is substantially the luminance signal Y, while the output of filter 2 is substantially the chrominance signal. These signals are then amplified respectively in a wide-band amplifier 3 and a narrow-band amplifier 4 to bring them up to a level suitable for synchronous detection. It will be understood that this is a schematic representation only, and that the functions of filter and amplifier might be combined in an amplifier having band-pass characteristics. Part of the output of chrominance amplifier 4 then goes to a $(B-Y)$ synchronous detector 5, while the remainder of the output goes to an $(R-Y)$ synchronous detector 6. In $(B-Y)$ detector 5, the chrominance signal is multiplied with a wave of chrominance-subcarrier frequency which may be derived from a subcarrier generator 9 which in turn derives its phase and frequency reference from a "burst" of subcarrier-frequency oscillations including periodically in the composite color television signal. In $(R-Y)$ detector 6, the chrominance signal is multiplied with a wave of chrominance-subcarrier frequency which may be derived from subcarrier generator 9 through a ninety-degree phase shifter 10. This type of prior-art system develops a signal $(B-Y)$ at the output of detector 5 and a signal $(R-Y)$ at the output of detector 6. By combining $(B-Y)$ and $(R-Y)$ in proper proportions in an adder 12, a color-difference signal $(G-Y)$ is produced, for application to the third electron gun of the color picture tube. In this type of system, as has been mentioned, the maximum color-difference voltage swings demanded from the detectors are in the ratio of 1.78 for $(B-Y)$ to 1.40 for $(R-Y)$, and this would correspond to a value of .82 for the $(G-Y)$ adder. Inasmuch as these values are very much out of balance, and inasmuch as it is desirable to interconnect the two detectors, economical design of the synchronous detectors is difficult. According to the principles of my invention, I avoid this difficulty by adding some of the $(B-Y)$ signal to the luminance signal path, thus allowing the luminance signal path to bear more of the signal burden and decreasing the amount of $(B-Y)$ signal which must be delivered directly from the $(B-Y)$ detector to the "blue electron gun." It then becomes necessary to add some $(B-Y)$ signal of negative polarity to the $(R-Y)$ and $(G-Y)$ paths in order to compensate for the extra $(B-Y)$ signal which in effect appears in those channels by reason of the addition of $(B-Y)$ to the Y channel.

In practice, I have found that better results may be obtained if a certain amount of $(R-Y)$ signal is added, together with the fraction of $(B-Y)$ signal, to the luminance, or Y, channel. However, before it can be clearly explained why such mixing of color-difference signals is permissible, it will be well to discuss further the process of synchronous detection of color-difference signals. In this connection, reference will be made to the vector diagram of Fig. 2, which represents in the phase plane all signals which can be derived from the chrominance signal by multiplying therewith a wave of subcarrier frequency and of adjustable phase. In general, it can be stated that any color-difference signal which is zero when the E signal represents standard white light can be detected from the chrominance signal by means of a synchronous detector employing a variable-phase wave of subcarrier frequency. That is to say, such a detector is capable, for instance, of detecting, instead of $(R-Y)$ or $(B-Y)$, a signal such as $(R-M)$ or $(B-M)$, where M is any quantity defined in terms of R, G, and B such that the total of the amounts taken of R, G, and B on a normalized basis is unity. Within this framework it is possible to detect any desired color-difference signal merely by changing the phase of the injected wave of subcarrier frequency. In such a case, it may be desired to detect two color-difference signals, by means of two synchronous detectors employing, respectively, two reference subcarrier waves which are related in phase by an angle other than ninety degrees. This represents a departure from the prior-art system as shown in Fig. 1.

Figure 2:
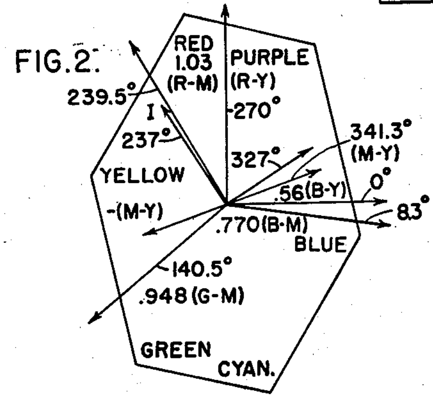
Fig. 2 is a vector diagram showing, with respect to a vector representing the signal $(B-Y)$ as a reference, just what color-difference signals may be detected in a synchronous detector for various phase angles of the demodulating subcarrier wave.

Turning to Fig. 2 of the drawings, there is presented a vector diagram showing the respective color-difference signals which would be detected for various phase angles, referred to the $(B-Y)$ chrominance component, of the injected subcarrier wave. The amplitudes of the vectors are normalized using the amplitude of the $(R-Y)$ chrominance component as a reference. Angles are measured clockwise on the diagram. It will be noted that not only vectors based on Y are displayed, but also vectors based on the new quantity M are shown. For this purpose, the quantity M is defined as follows:

$$M=\frac{1R}{3}+\frac{1G}{3}+\frac{1B}{3} \qquad \text{(Eq. 6)}$$

The hexagon having the three primary colors and three secondary colors at its corners has this significance: If a vector is drawn representing the phase (relative to $B-Y$) of the subcarrier wave which is to be injected into the synchronous detector, the amplitude of the color-difference signal which will be detected for that subcarrier phase corresponding to transmission and reception of the particular color may be determined by drawing a line from the corner labeled with the name of the color in question, said line being perpendicular to the subcarrier phase vector and intersecting it. The amplitude of the color-difference signal which will be detected for that color and subcarrier phase is then represented by the length of the vector between the origin and the intersection with the aforementioned line. The entire chrominance information may be recovered from the chrominance signal by detecting two color-difference signals therefrom at an arbitrary phase angle with each other and then by performing certain mathematical operations with the two color-difference signals and the luminance signal Y in order to derive the three primary color signals R, G, annd B. According to the principles of my invention, I choose the two detected color-difference signals in such a way that the two respective synchronous detectors are enabled to operate efficiently and without overload.

The mathematical operation by which the primary color signals are derived from the color difference signals is known as "matrixing" because of the form of the equations governing the operation. It happens that, in order to produce certain primary color signals from certain color-difference signals, negative amounts of some of those color-difference signals are required. Therefore, in order to obviate the necessity of using phase-inverting circuits, it is convenient to employ synchronous detectors capable of producing a color-difference signal and the negative of that color-difference signal at the same time. Such a detector may employ a beam-deflection type of tube such as the type commercially designated 6AR8, which is so constructed that the electron beam of magnitude controllable by a signal on a first control grid is divided between two anodes, in a ratio depending upon a voltage difference applied from a second signal source to a pair of deflection electrodes within the 6AR8. Thus, any increment of the electron beam which is deflected in such a way as to be added to the beam already intercepted by one anode represents a substantially equal increment of the electron beam subtracted from the beam intercepted by the other anode. In this way, owing to the voltage drops in the anode resistors, a positive incremental signal produced by one anode is accompanied by an equal negative incremental signal produced by the other anode.

The foregoing paragraphs have implied that, in the method and apparatus of my invention, color-difference signals involving the quantity M are detected. In one embodiment of my invention, this is true. In the embodiment of my invention shown in Fig. 3, I employ a $(G-M)$ detector 101 and an $(R-M)$ detector 102 instead of a $(B-Y)$ detector and an $(R-Y)$ detector as in the prior-art system of Fig. 1. The outputs of $(G-M)$ detector 101 and $(R-M)$ detector 102 are then "matrixed" in a $(B-M)$ adder 103 to form the signal $(B-M)$. Furthermore, according to my inventions, parts of the $(G-M)$ and $(R-M)$ signals are respectively fed through two resistive networks 106 and 107 to the input side of an amplifier 108 which operates on the Y signal. It will be noted that the remainder of the signal input to amplifier 108 (i.e., the Y signal), is derived from the composite color television signal E by a low-pass filter and delay network 110. The reason for inserting delay in the Y channel is to insure that, when the output of this channel is later added to the color-difference signals at the color picture tube, equal total phase delay will have been suffered by the various signal components. Inasmuch as the Y channel usually has less inherent delay than do the chrominance paths, artificial delay must be introduced thereinto. This artificial delay may, in some cases, be as small as one microsecond, but is nevertheless important to prevent misphasing of signals having frequencies of the order of megacycles per second.

Figure 3:
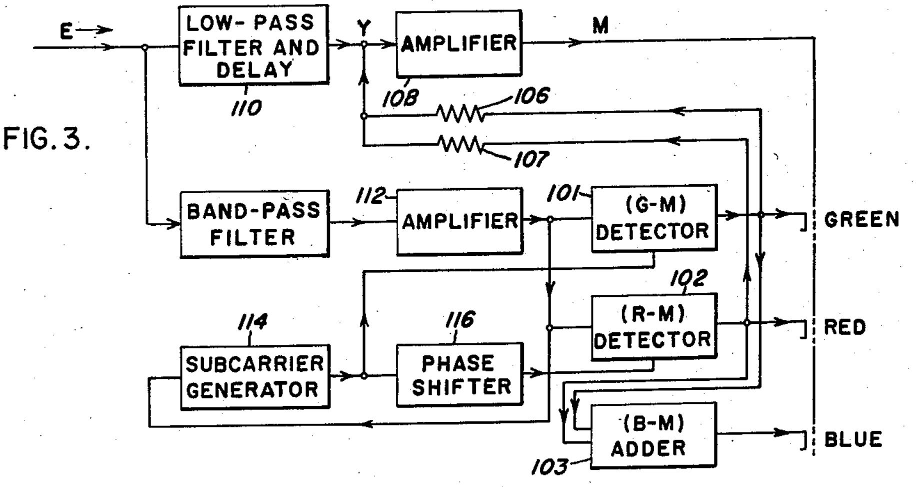
Fig. 3 is a schematic block diagram of a signal-processing system according to my invention in which the output required from the more heavily loaded synchronous detector is reduced to an absolute minimum.

The chrominance path of the embodiment of Fig. 3, like that of the embodiment of Fig. 1, includes an amplifier 112 in the line preceding the two detectors 101 and 102 so that the synchronous detection can be performed at a relatively high power level. Thus, by amplifying the chrominance signal prior to detection, it is possible to get along with amplification in only a single chrominance path, rather than employing amplifiers in both chrominance-component channels. Moreover, the color-difference signals are then available in large amplitude, and with either polarity available, at the anodes of the synchronous detectors. Hence, the color-difference signals are available in whatever amplitude may be required for feeding back to the wide-band, or Y, path, and the new signal to be delivered by amplifier 108 may be freely selected. In fact, it will be shown later in this specification that, in general, it may be desirable to feed back signals other than the full amounts of $(G-M)$ and $(R-M)$, thus in effect developing in the broad-band channel a new signal which is neither Y nor M as previously defined. However, for the purposes of discussion of the embodiment of Fig. 3, which permits use of minimum-output synchronous detectors, it will be assumed that the full amounts of $(G-M)$ and $(R-M)$ are fed back, so that the output of amplifier 108 is the signal M as defined in Equation 6. The modifications of this system will be discussed in connection with the explanation of the embodiment of Fig. 5, which is a system that makes it possible for the two synchronous detectors to be driven by the same signals.

In the system of Fig. 3, detector 101 produces the signal $(G-M)$, detector 102 produces the signal $(R-M)$, and adder 103 produces the signal $(B-M)$, all as defined in the following equations:

$$(G-M)=\tfrac{2}{3}G-\tfrac{1}{3}R-\tfrac{1}{3}B \quad \text{(Eq. 7)}$$
$$(R-M)=\tfrac{2}{3}R-\tfrac{1}{3}G-\tfrac{1}{3}B \quad \text{(Eq. 8)}$$
$$(B-M)=\tfrac{2}{3}B-\tfrac{1}{3}R-\tfrac{1}{3}G \quad \text{(Eq. 9)}$$

In this system, the reference subcarrier wave for injection into the synchronous detectors is generated in a subcarrier generator 114 similar to subcarrier generator 9 in the embodiment of Fig. 1, with similar phase and frequency synchronization based on the "color burst" derived from the composite color television signal. However, in the embodiment of Fig. 3, the wave injected into the $(R-M)$ detector has been passed through a phase shifter 116 which imposes a phase shift of 99 degrees from the reference, rather than the 90 degrees shift imposed by phase shifter 10 in the embodiment of Fig. 1.

Figure 4:
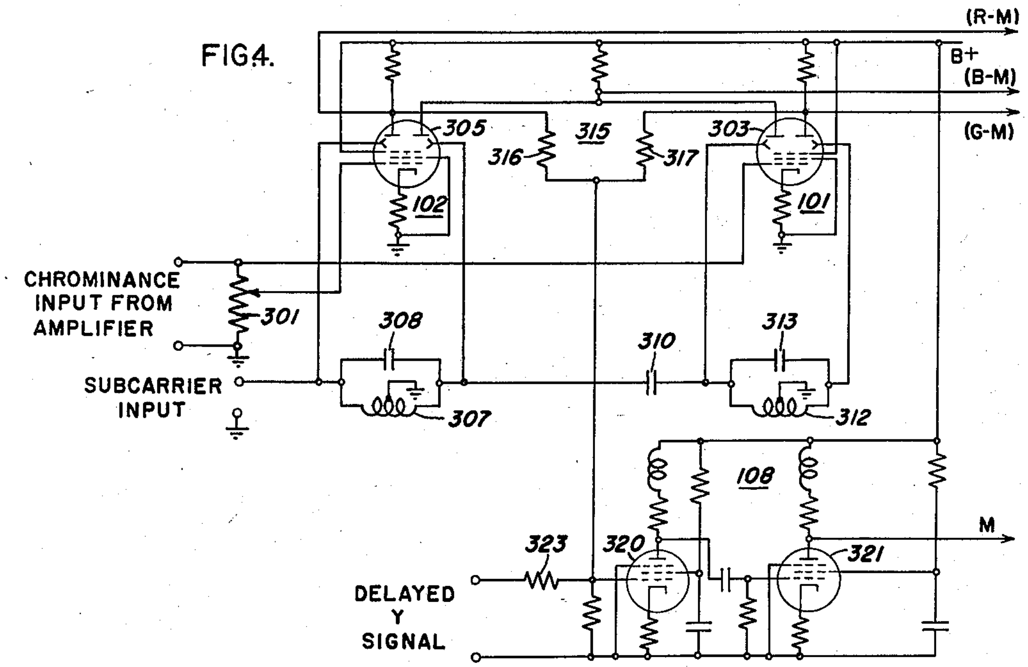
Fig. 4 is a detailed schematic diagram of a suggested embodiment of the two synchronous detectors, the modified-Y-channel amplifier and the associated circuitry called for in the block diagram of Fig. 3.

In order to understand more fully the operation of synchronous detectors 101 and 102, reference should be made to the detailed schematic circuit diagram of Fig. 4, which shows suggested circuitry for those subcombinations, as well as for amplifier 108 of the M signal path. In Fig. 4, the chrominance signal is fed to a device which may be exemplified by a potentiometer 301 such that the full chrominance signal goes through to the first control grid of a beam-deflection tube 303, while a portion of the chrominance signal represented by the fraction $.95/1.03$ goes to the first control grid of a second beam-deflection tube 305. Beam deflection tubes 303 and 305 constitute one example of what may in general be termed a "multiple-electric-flow-path electric valve," that is to say, an electric valve having more than one output path for a given input path and provided with means to control the electric flow from said input path and with means to direct said flow to any selected output path. The beam-deflection tube 303 is the heart of $(G-M)$ detector 101, while beam-deflection tube 305 is the heart of $(R-M)$ detector 102. The reason for the drive of the $(R-M)$ detector having to be smaller than that of the $(G-M)$ detector will become apparent upon definition of the new color-difference signals in terms of the more usual color-difference signals $(R-Y)$ and $(B-Y)$. These definitions may be expressed by the following equations:

$$1.03(R-M)=(R-Y)\cos 30.5°-\frac{1}{1.78}(B-Y)\sin 30.5° \quad \text{(Eq. 10)}$$

$$.95(G-M)=(R-Y)\cos 50.4°-\frac{1}{1.78}(B-Y)\sin 50.4° \quad \text{(Eq. 11)}$$

$$.77(B-M)=-(R-Y)\cos 82.7°-\frac{1}{1.78}(B-Y)\sin 82.7° \quad \text{(Eq. 12)}$$

These definitions are rooted in the identities of Equations 3, 6, 7, 8, and 9, and show the relative gain factors 1.03 and .95 as respective coefficients of $(R-M)$ and $(G-M)$ in Equation 10 and Equation 11. The angles specified in these equations are phase angles of the respective injected subcarrier waves, as referred to the phase of the $(B-Y)$ chrominance component, measured in the detectors. Of course, if it were desired to detect the signals $(R-M)$ and $(B-M)$ and obtain $(G-M)$ by matrixing, instead of detecting $(R-M)$ and $(G-M)$ and obtaining $(B-M)$ by matrixing, then the relative amounts of chrominance signal fed to the $(R-M)$ and $(B-M)$ detectors would be in the ratio .77/1.03. In the case of detecting $(G-M)$ and $(B-M)$, the relative amounts of chrominance signal excitation to those detectors would be in the ratio .77/.95. It will be understood that substantial compliance with all these specifications is sufficient.

Returning to the case of detection of $(R-M)$ and $(G-M)$ as in the embodiments of Figures 3 and 4, it will be noted that use of beam-deflection-type detector tubes permits simplification of the matrixing process because one anode of tube 303 may be directly connected to one anode of tube 305 to produce the signal $(B-M)$. This is true because of the following relationship, which follows from the definition of M:

$$(B-M)=-(G-M)-(R-M) \quad \text{(Eq. 13)}$$

Clearly the anodes of tubes 303 and 305 corresponding to negative deflection in those tubes are the ones which should be connected together. One other point which is almost self-evident is the fact that, instead of feeding different amounts of the chrominance signal to the two synchronous detectors, the respective gains of those detectors might be made slightly different in order to achieve the same effect in the outputs.

Again in Figures 3 and 4, it will be noted that the reference subcarrier wave comes in from subcarrier generator 114 and excites a resonant circuit which might comprise an inductor 307 and a capacitor 308, across which is taken the voltage applied to the beam-deflecting electrodes of tube 305. This resonant circuit may then be connected through a capacitor 310 to form a phase-shifting network and further to excite another resonant circuit which may comprise an inductor 312 and a capacitor 313. Across this last-named resonant circuit is taken a voltage applied to the beam-deflecting electrodes of tube 303. Thus, the reference subcarrier wave is injected into both detector tubes by providing continuous and cyclic deflection of the respective electron beams at a frequency of the subcarrier and with a phase which may be selected according to the outputs desired from the detectors.

In Fig. 4, the feedback voltages are shown as taken at the "positive" anodes of the detector tubes and fed to a matrix unit 315 which may, for instance, comprise a first resistor 316 and a second resistor 317, joined at one end of each. The voltage at this junction point is thereupon fed to the input terminal of amplifier 108, which is shown as a simple, two-stage pentode amplifier having plate circuit inductors in order to provide high-frequency compensation. The input signal goes to the control grid of a first pentode 320, while the output may be taken at the plate of a second pentode 321. In addition to the voltage derived from the junction of resistors 316 and 317 of matrix unit 315, the input to the control grid of pentode 320 comprises a delayed Y signal derived from low-pass filter and delay network 110 through a resistor 323 which permits addition at the pentode grid.

The addition which takes place at the grid of tube 320 should be such as to be expressed by either of the following two equations:

$$M=Y-.48(G-M)-.19(R-M) \quad \text{(Eq. 14)}$$
$$M=Y+.48(B-M)+.29(R-M) \quad \text{(Eq. 15)}$$

It will be apparent that the color-difference signals utilized, together with Y, to synthesize M may be derived either directly from the anodes of the synchronous detectors or, if it is desired to utilize a color-difference signal which is not directly detected, from the anode of one detector and from the combining matrix network 315. Choice of which signal components are utilized may depend upon the relative polarity of the Y signal at the point of addition.

The effects upon the performance of amplifier 108 produced by the addition of the feedback signal components to its input warrant some discussion at this point. In the first place, it happens that the feedback of these signal components to the amplifier input does not increase the output-voltage-swing requirements placed upon the amplifier. As for the signal delay produced in amplifier 108, it is to be remembered that this amplifier must have a passband sufficiently great to enable it to pass the Y signal, which is a relatively wide-band signal. Since some degree of signal delay is a concomitant of the compensation which produces a wide-band amplifier, the output signal from amplifier 108 will have been delayed to some extent. This is true not only of the Y signal passed through it but also, to some degree, of any signal components fed back to the amplifier input from the synchronous detectors and matrix network 315 when such feedback is employed. It is to be noted, however, that the fed-back signal components, $(M-Y)$, having been derived from the chrominance channel, are narrower in bandwidth than the Y signal. Therefore, the differential phase-shift effects among the components of $(M-Y)$ are smaller than those among the components of Y.

As has been stated, the system and method described in the preceding paragraphs, in which a new signal M is generated by means of feedback, are directed to the reduction of the voltage swing demanded at the output of the synchronous detectors. Inasmuch as my system and method provide for a reduction of this swing by approximately 25 percent, as compared with prior-art systems and methods, it is clear that this objective has been attained. Furthermore, my system and method permit reduction, by more than 25 percent, of the amplitude of the chrominance signals which drive the synchronous detectors. By selecting $(R-M)$ as one of the quantities which is directly detected by one of the synchronous detectors, one obtains (as will be made apparent by reference to the vector diagram of Fig. 2) a signal which is only three degrees in phase from the quantity I, as defined in Equation 5. Thus, by suitably modifying the amplitude of $(R-M)$, one can obtain, within a very good approximation, a signal expressive of the quantity I which can be utilized in some receivers which require the signals Q and I.

While the preceding paragraphs have been directed to a system and method in which two of the three color-difference signals, $(R-M)$ $(G-M)$, and $(B-M)$, are detected and are combined and, in proper proportions, added to Y to form a signal M, as defined, it may sometimes be desired to detect signals slightly different from these color-difference signals and to combine them with Y in such a way as to produce a signal, other than M, which may then be utilized in conjunction with the new color-difference signals to actuate the respective electron guns. Such a revised system will not have detector output-voltage requirements as low as those of the system and method as previously discussed, but may have certain advantages which compensate for the detector-output-voltage disadvantage. For instance, if for some reason it is desired to drive the two synchronous detectors with the same chrominance signal (without first changing the amplitude of the input to one detector), two new signals must be generated by the synchronous detectors and must be combined in proper proportions with Y to form a new signal, different from M. This new wide-band signal may be designated L, and a derivation will be presented in order to show what the definition of L should be, in order to produce optimum results under certain conditions.

In the first place, if the phosphors of the color picture tube are such that equal drive of the three electron guns is desired, it will be found desirable to choose detected color-difference signals and fed-back voltages such that wide-band amplifier 108 is driven by a quantity $L_1$, defined as follows:

$$L_1=.36R+.31G+.33B \qquad \text{(Eq. 16)}$$

In order to form such a signal at the input of the wide-band amplifier, the synchronous detectors must respectively detect color-difference signals as defined by the following expressions:

$$1.07(R-L_1)=(R-Y)\cos 30.3^\circ-1/1.17(B-Y)\sin 30.3^\circ \qquad \text{(Eq. 17)}$$

$$.925(G-L_1)=-(R-Y)\cos 49^\circ-1/1.78(B-Y)\sin 49^\circ \qquad \text{(Eq. 18)}$$

It will be observed that these equations mean that the reference wave of subcarrier frequency injected into the $(R-L_1)$ detector must lead the component $(R-Y)$ therein by an angle of 30.3°. Furthemore, the reference wave of subcarrier frequency injected into the $(G-L_1)$ detector must lead the component $(R-Y)$ therein by an angle of (180—49) degrees, where the subtraction from 180° must be performed because of the negative sign characterizing the $(R-Y)$ component in Equation 18. If a value of L is chosen as defined by Equation 16, and detected color-difference signals are chosen as defined by Equations 17 and 18, then a signal as defined by the following equation must be produced by a matrixing process:

$$.985(B-L_1)=-1.07(R-L_1)-.925(G-L_1) \qquad \text{(Eq. 19)}$$

A circuit diagram of detectors, matrix unit, and broad-band amplifier for producing the signals as defined by these equations is shown in Fig. 5 of the drawings. In Fig. 5, it will be noted that, unlike the corresponding circuit elements in Fig. 4, the control grids of detector tubes 403 and 405 are driven by the same chrominance signal, without amplitude modification for one tube input. Furthermore, it will be noted that the circuit of Fig. 5 possesses plate load resistors 425, 426, and 427 which have respective magnitudes in the ratios $R/1.07$, $R/.985$, and $R/.925$. The reason for making these load resistors dissimilar, whereas the plate load resistors in the circuit of Fig. 4 were equal, is, of course, the inequality of coefficients of the color-difference signals in Equations 17, 18 and 19. Note that, with the system of Fig. 5, the "negative" anodes of the two detector tubes can still be connected directly together. The reference wave of subcarrier frequency fed from the parallel combination of inductor 407 and capacitor 408 to the detector tube 403 (the $R-L_1$ detector) should be related to the $(B-Y)$ component, the reference vector of Fig. 2, in detector tube 403 by an angle of 239.7 degrees. The reference wave fed from parallel combination of inductor 412 and capacitor 413 to the detector tube 405 (the $G-L_1$ detector) should be related to the $(B-Y)$ component in detector tube 405 by an angle of 139 degrees.

The matrix resistors 416 and 417 in Fig. 5 should be such that the following signal is fed to the input of the wide-band amplifier including pentodes 420 and 421, there to be combined with the Y signal:

$$-.485(G-L_1)-.18(R-L_1)$$

If it is chosen to employ for feedback purposes one detected color-difference signal and one matrixed color-difference signal, the feedback signal fed from the matrix resistors to the wideband amplifier may be expressed as follows:

$$.518(B-L_1)+.385(R-L_1)$$

Of course, the total input to amplifier tube 420 should be expressed by one of the following equations, depending upon which color-difference signals are employed to constitute the feedback signal:

$$L_1=Y-.485(G-L_1)-.18(R-L_1) \qquad \text{(Eq. 20)}$$

$$L_1=Y+.518(B-L_1)+.385(R-L_1) \qquad \text{(Eq. 21)}$$

The system shown in Figures 3 and 4 have been based upon the assumption that the color picture tube employed requires exciting signals of equal magnitude for the three electron guns. Such symmetrical excitation is made possible by the way in which the quantity M was defined. The system of Fig. 5, on the other hand, is such that it is suitable for use with a color picture tube which either can tolerate or requires unequal exciting signals for the three electron guns. The nature of the signals produced is fixed by the definition of the new wide-band signal $L_1$, as stated in Equations 16, 20 and 21. The system of Fig. 5 is characterized by the fact that the control grids of the two synchronous detectors may be connected together, and the "negative" anodes of the two detector tubes may also be connected together. Now, if the system to be employed does not necessarily require those two connections to be direct, there is somewhat more freedom of choice of the new wide-band signal to be employed. If a new wideband signal to be called simply "L" is to be employed, there is considerable latitude of definition of this signal. For some definitions of L, the two connections above referred to may be made direct, while for other definitions of L, it will be necessary to employ some network between the connected points.

In general, as before, three different detector-and-matrix configurations are possible. In the first, the signals $(R-L)$ and $(G-L)$ are independently detected, while $(B-L)$ is formed by a linear operation such as matrixing on $(R-L)$ and $(G-L)$. In the second, $(R-L)$ and $(B-L)$ are independently detected, and $(G-L)$ is formed by a linear operation on $(R-L)$ and $(B-L)$. In the third, $(B-L)$ and $(G-L)$ are independently detected, and $(R-L)$ is formed by a linear operation on $(B-L)$ and $(G-L)$. For each of these configurations, once L is fixed, the system is completely defined. In order to study the effects of changes in the make-up of the wide-band signal L, it will be useful to define that signal in general terms, as follows:

$$L=rR+gG+bB \qquad \text{(Eq. 22)}$$

where the only initial restriction is a normalization of the coefficients of the primary-color signals, which can be expressed as follows:

$$r+g+b=1 \qquad \text{(Eq. 23)}$$

This restriction is necessary in order to be certain that $(R-L)$, $(G-L)$, and $(B-L)$ will be signals detectable by a simple operation. From Equations 22 and 23, we find the following expression, which determines the way one color-difference signal will be formed by a matrix operation on the other two color-difference signals:

$$r(R-L)+g(G-L)+b(B-L)=0 \qquad \text{(Eq. 24)}$$

If $(B-L)$ is to be formed by the matrix, we have $$b(B-L)=-r(R-L)-g(G-L) \qquad \text{(Eq. 25)}$$

If $(B-L)$ is to be formed by interconnecting the respective "negative" anodes of the $(R-L)$ and $(G-L)$ detectors, the choice of definition of L should be such that $(R-L)$ and $(G-L)$ are detected with gain factors respectively proportional to $r$ and $g$. Even though $(R-L)$ and $(G-L)$ can be detected for all values of L, assuming only that $r+g+b=1$, they may not be detected in amplitude ratio of $r/g$ for all values of L unless the two detector grids are driven by signals of different amplitude. It will be informative to determine just what the characteristic of L must be in order to permit the control grids of the two detector tubes to be directly connected and the "negative" anodes of the two detectors to be likewise directly connected.

Assuming in first approximation that equal plate load resistors are utilized for the two synchronous detectors, the amounts of the respective color-difference signals applied to the grids of the color picture tube will be $r(R-L)$, $g(G-L)$, and $b(B-L)$. In order to effect cancellation of the quantity L from the net driving signal applied to the respective electron guns, the signals fed from the output side of the broad-band amplifier to the respective cathodes of the electron guns will have to be $r$L, $g$L, and $b$L rather than merely the signal L. This means that some type of voltage divider characterized by the ratios $r$, $g$, and $b$ should be employed in the output circuit of the broad-band amplifier. This arrangement can best be illustrated by reference to the suggested circuit embodiment of Fig. 6, in which there is a pentode 521 at the output end of the broad-band amplifier, said pentode having taps on its plate load resistor such that the resistor is divided into three sections 551, 552, and 553 from which the respective desired signals $r$L, $g$L, and $b$L may be taken. These signals may then be fed to the cathodes of the respective electron guns in such a way as to permit additive combination with the color-difference signals on the grids of the respective electron guns, producing net actuating signals on the electron guns of $r$R, $g$G, and $b$B respectively. It will be understood that the foregoing discussion has been presented in terms of incremental, rather than total, signal voltages. Further, while it has been assumed for the purposes of illustration that the color-difference signals have been applied to the grids of the respective electron guns, it will be understood that, as long as proper account of polarities is taken, signal summation may alternatively be accomplished by applying the color-difference signals to the cathodes of the electron guns and the appropriately weighted L signals to the respective grids of the electron guns.

Now, if the drive requirements of the respective electron guns of the color picture tube happen not to be exactly proportional to the factors $r$, $g$, and $b$, it becomes necessary to choose a definition for L such that the drive-ratio requirements are approximately satisfied, whereupon adjustments in the load resistors of the synchronous detectors will be made in order to produce the desired color-difference signals. Specifically, load resistors 555 and 556 of the respective detector tubes 503 and 505, together with the mutual load resistor 557, must be adjusted to produce the desired color-difference signals. It should be noted that gross inequalities between these load resistors would lead to unequal time delays and transient responses in the three color-difference channels and that, therefore, the differences among the resistors should not be exaggerated.

For the configuration of Fig. 6, in which the color-difference signal $(B-L)$ is obtained by combining the outputs of the "negative anodes" of detector tubes 503 and 505, it can be shown that, for efficient circuit operation, the definition of L should be such that the color-difference signals $(R-L)$ and $(G-L)$ are detected using injected subcarrier waves of phase differing by an angle not exceeding 120 degrees. If the subcarrier waves injected into the two detectors differ in phase by an angle of 120 degrees, it apparently does not matter whether the configuration of Fig. 6 is employed or whether either of two other configurations is utilized. In the first one of these two other configurations, the color-difference signals $(R-L)$ and $(B-L)$ are directly detected, while the color-difference signal $(G-L)$ is formed by a linear combination of $(R-L)$ and $(B-L)$. In the second one of these two other configurations, the color-difference signals $(G-L)$ and $(B-L)$ are directly detected, while the color-difference signal $(R-L)$ is formed by a linear combination of $(G-L)$ and $(B-L)$. In general, if a particular circuit configuration has been chosen, and the definition of L makes it necessary to detect color-difference signals by the use of subcarrier waves spaced in phase by more than 120 degrees, it will be found advisable to change the circuit configuration to the one which permits detection with subcarrier waves spaced in phase by less than 120 degrees. Thus the definition of L for which the subcarrier waves injected into the detectors differ in phase by 120 degrees regardless of which configuration is chosen is a critical definition and is in the nature of a boundary line between zones for which the respective circuit configurations are relatively efficient. For this reason, it will be useful to state the definition of L and the values of the coefficients $r$, $g$, and $b$ for this critical point.

It can be shown that the critical point occurs where the subcarrier waves injected into the two synchronous detectors respectively lag the $(B-Y)$ chrominance component in those detectors by any two of the following three angles:

$$\text{Expression 26}\begin{cases}110.7 \text{ degrees for an } (R-L) \text{ detector}\\230.7 \text{ degrees for an } (G-L) \text{ detector}\\350.7 \text{ degrees for an } (B-L) \text{ detector}\end{cases}$$

It will be understood that whichever of the three above-identified color-difference signals is not directly detected can be formed by combining the output of the "negative anodes" of the respective synchronous detectors. The angles have been stated with some precision because this is the definition of a critical point, rather than a definition of a desired operating point. It will be further understood that any attempt to define precisely a desired operating point would be futile because of the necessary latitude required for the operation of a receiver.

It is found that, for the critical point defined by the above-listed angles, the weighted color-difference signals have the following values:

$$\begin{aligned}r(R-L)&=.627R-.382G-.245B\\g(G-L)&=-.382R+.585G-.203B\\b(B-L)&=-.245R-.203G-.448B\end{aligned}\qquad\text{(Eq. 27)}$$

Solution of these expressions for the values of the coefficients $r$, $g$, and $b$ leads to a definition of the critical value of L as follows:

$$L_0=.424R+.351G+225B\qquad\text{(Eq. 28)}$$

This value of L has been denoted "$L_0$" to emphasize that it is a critical value for which any of the three configurations may equally well be employed. That is to say, if L is defined by the expression for $L_0$, it does not matter whether $(R-L)$ and $(G-L)$ are directly detected, with $(B-L)$ formed by linear combination, or whether $(R-L)$ and $(B-L)$ are directly detected with $(G-L)$ formed by linear combination, or $(B-L)$ and $(G-L)$ are directly detected, with $(R-L)$ formed by linear combination. Of course, whichever configuration is chosen, the phase angles of the two injected subcarrier waves must be appropriately chosen from the values in Expression 26, supra.

If it is desired to employ a circuit configuration which will permit a relatively larger signal to be applied to the "blue" electron gun than to the "red" or "green" electron guns, it will generally be found best to employ the configuration in which $(R-L)$ and $(G-L)$ are directly detected, with $(B-L)$ formed by linear combination. Similarly, if relatively large drive of the "green" electron gun is required, it will be found best to detect directly $(R-L)$ and $(B-L)$. Further, if relatively large drive of the "red" electron gun is required, it will probably be best to detect directly $(B-L)$ and $(G-L)$. It follows from Equation 28 that, if nearly equal driving voltages are required for the three electron guns of the color picture tube, the configuration in which $(R-L)$ and $(G-L)$ are directly detected is likely to be the most favorable one to employ. This is the configuration shown in Fig. 6.

To summarize the preceding discussion on choice of the quantity L, it may be stated as a general principle that the quantity L and the chosen circuit configuration should be so related that the subcarrier waves injected into the respective synchronous detectors do not differ in phase by more than 120 degrees. If the choice of the quantity L has been made in such a way as to cause this condition to be breached in the circuitry of the configuration chosen, then consideration should be given to the possibility of changing to one of the other two configurations. This is, if this condition is not satisfied, one of the color-difference signals originally planned to be directly detected should be replaced by the color-difference signal originally planned to be formed by linear combination. It will be noted that, in general, for the circuit configuration of Fig. 6, neither the grids nor the cathodes of the three color-tube electron guns are connected directly together.

The foregoing pages have shown apparatus and a method by which maximum efficiency and convenience may be achieved in detecting three primary-color signals from a composite color television signal. As was stated in the introductory paragraphs of this specification, my invention is broader than simply a method and apparatus for detecting primary color signals from a composite color television signal. My invention can be applied to the resolution of any composite signal into its components, where the composite signal can first be broken into two parts by some means such as separation in the frequency domain, and where one of those parts is further separable into components which under one certain circumstance can be made to approach zero magnitude. Such a composite signal might, for instance, be received in a telemetering operation where pieces of information concerning a number of variable quantities are to be derived therefrom. The method and apparatus of my invention are such as to permit such derivation to be made with maximum efficiency.

While specific embodiments of my invention have been shown and described, it will, of course, be understood that various modifications may be made without departing from the principles of the invention. The appended claims are therefore intended to cover any such modifications within the true scope of the invention.

What I claim as new and desire to secure by Letters Patent of the United States is:

1. A signal-processing system for a composite signal, said signal comprising at least two parts characterized by different distributions in the frequency spectrum, one of said parts being further resolvable into two components, said signal-processing system comprising an input circuit for application of said composite signal, means coupled to said input circuit for substantially separating said parts of said composite signal, means coupled to one output of said separating means for synchronously detecting two components from a first one of said parts, means for linearly combining selected portions of said two synchronously detected components with a second one of said parts derived in said separating means to form a modified second part, means for forming a third component from said two synchronously detected components of said first part, and output means for effectively combining said modified second part respectively with each of said two first-named synchronously detected components and with said third component.

2. A signal-processing system for a composite signal, said signal comprising at least two parts characterized by different distributions in the frequency spectrum, one of said parts being further resolvable into components, said signal-processing system comprising an input circuit for application of said composite signal, means coupled to said input circuit for substantially separating said parts of said composite signal, means coupled to one output of said separating means for synchronously detecting two components from a first one of said parts, means for forming from said two synchronously detected components a third component, means for linearly combining selected portions of said two synchronously detected components with a second one of said parts derived in said separating means to form a modified second part, amplitude-changing means for operating upon said modified second part, and output means for effectively combining the output of said amplitude-changing means respectively with each of said two first-named synchronously detected components and with said third component to form three output signals.

3. A signal-processing system for a composite signal, said signal comprising at least two parts characterized by different distributions in the frequency spectrum, one of said parts being further resolvable into two components, said signal-processing system comprising an input circuit for application of said composite signal, means coupled to said input circuit for substantially separating said parts of said composite signal, means coupled to one output of said separating means for synchronously detecting two components from a first one of said parts, means for forming from said two synchronously detected components a third component, means for linearly combining selected portions of said two synchronously detected components with a second one of said parts derived in said separating means to form a modified second part, amplitude-changing means for operating upon said modified second part and three-channel-utilization means having the output of said amplitude changing means fed to each of said three channels simultaneously with one each of said synchronously detected components and said third component.

4. A signal-processing system for a composite signal, said signal comprising at least two parts characterized by different distributions in the frequency spectrum, one of said parts being further resolvable into two components, said signal-processing system comprising an input circuit for application of said composite signal, filter means coupled to said input circuit for substantially separating said parts of said composite signal, means coupled to one output of said filter means for synchronously detecting two components from a first one of said parts, adder means for forming from said two synchronously detected components a third component, resistive means for linearly combining selected portions of said two synchronously detected components with a second one of said parts derived in said separating means to form a modified second part, amplifier means for operating upon said modified second part, and output means for effectively combining the output of said amplifier means respectively with each of said two synchronously detected components and with said third component to form three output signals.

5. Apparatus for processing a composite signal, said signal comprising at least two parts characterized by different distributions in the frequency spectrum, one of said parts being further resolvable into two components, said apparatus comprising an input circuit for application of said composite signal, filter means coupled to said input circuit for substantially separating said parts of said composite signal, means coupled to one output of said filter means for synchronously detecting two components from a version of a first one of said parts, means for forming a third component from said two first-named synchronously detected components, means for linearly combining selected portions of said two first-named synchronously detected components with a second one of said parts derived by said filter means to form a modified second part, and means for effectively combining a version of said modified second part respectively with each of said two first-named synchronously detected components and with said third component to form three output signals.

6. A signal processing system for a composite signal, said signal comprising at least two parts characterized by different distributions in the frequency spectrum, one of said parts being further resolvable into two components; said signal-processing system comprising an input circuit for application of said composite signal filter means coupled to said input circuit for substantially separating said parts of said composite signal, means coupled to one output of said separating means for synchronously detecting two components from a first one of said parts, adder means for forming a third component from said two synchronously detected components, resistive means for linearly combining selected portions of said two synchronously detected components with a second one of said parts derived in said filter means to form a modified second part, amplifier means for operating upon said modified second part, voltage divider means to select portions of the output of said amplifier, and output means for effectively combining said selected portions of the output of said amplifier means respectively with each of said two synchronously detected components and with said third component to form three output signals.

7. Demodulation apparatus for processing a composite color television signal comprising a luminance component and two color difference components modulated in quadrature on a color subcarrier, comprising an input circuit for application of said composite signal, filter means coupled to said input circuit for separating said luminance from said color difference components, synchronous detection means including at least two beam deflection-type discharge devices, each of said discharge devices having a control electrode, deflection means, and two output anodes, means coupling both of said color difference components to each of said control electrodes in predetermined relative amplitudes, means coupling waves of subcarrier frequency in predetermined phases, specifically selected to avoid a mutual quadrature relationship, to each of said deflection means, a first anode of a first one of said discharge devices being connected to a first load impedance for deriving a first modified primary color difference component, a first anode of a second one of said discharge devices being connected to a second load impedance for deriving a second modified primary color difference component, and a second anode of one of said discharge devices being directly connected to a second anode of said second one of said discharge devices, and a third load impedance for deriving a third modified primary color difference component, said relative amplitudes and phases being selected to reduce the operating levels of said synchronous detection means while producing said three modified primary color difference components.

8. The combination set forth in claim 7, wherein the parameters are adjusted for derivation of the quantities $(R-M)$, $(B-M)$, and $(G-M)$ in said load impedances.

9. The combination set forth in claim 7 wherein selected portions of said two modified primary color difference components derived at said first anodes are jointly combined with the luminance component derived in said filter means to form a modified luminance component, having the property that when added separately to each of said modified primary color difference components that the three color primaries are respectively separately obtained.

10. The combination set forth in claim 7 wherein the circuit parameters are adjusted for derivation of the quantities $(R-M)$, $(B-M)$, and $(G-M)$ in said load impedances, and wherein selected portions of two of said modified primary color difference components derived at said first anodes are combined with the luminance component derived in said filter means to form a modified luminance (M) signal, having the property, when added separately to each of said modified primary color difference components, of producing the three color primaries (R, B, G).

11. The combination set forth in claim 7 wherein said chrominance components are fed to said discharge devices at the same amplitudes while said subcarrier deflecting voltages are fed to both discharge devices at other than reference phases.

References Cited in the file of this patent

UNITED STATES PATENTS

| | | |
|---|---|---|
| 2,728,813 | Loughlin | Dec. 27, 1955 |
| 2,779,818 | Adler | Jan. 29, 1957 |

FOREIGN PATENTS

| | | |
|---|---|---|
| 726,030 | Great Britain | Mar. 15, 1955 |